United States Patent [19]

Efron et al.

[11] Patent Number: 4,826,300

[45] Date of Patent: May 2, 1989

[54] SILICON-ON-SAPPHIRE LIQUID CRYSTAL LIGHT VALVE AND METHOD

[75] Inventors: Uzi Efron, Los Angeles; Paul O. Braatz, Canoga Park; Prahalad K. Vasudev, Thousand Oaks; Glenn D. Robertson, Malibu, all of Calif.

[73] Assignee: Hughes Aircraft Company, Los Angeles, Calif.

[21] Appl. No.: 79,607

[22] Filed: Jul. 30, 1987

[51] Int. Cl.$^4$ .............................................. G02F 1/13
[52] U.S. Cl. ............................ 350/342; 350/339 R; 350/338; 437/4; 437/5; 437/225; 437/236
[58] Field of Search ............... 350/339 R, 342, 641, 350/338; 437/4, 5, 21, 22, 225, 236

[56] References Cited

U.S. PATENT DOCUMENTS

| | | | |
|---|---|---|---|
| 3,508,962 | 4/1970 | Manasevit et al. | 117/227 |
| 3,546,036 | 12/1970 | Manasevit | 156/17 |
| 3,824,002 | 7/1974 | Beard | 250/331 |
| 4,024,626 | 5/1977 | Leupp et al. | 29/571 |
| 4,032,954 | 6/1977 | Grinberg et al. | 357/30 |
| 4,191,452 | 3/1980 | Grinberg et al. | 350/342 |
| 4,191,454 | 3/1980 | Braatz et al. | 427/38 |
| 4,198,647 | 4/1980 | Grinberg et al. | 350/342 |
| 4,228,449 | 10/1980 | Braatz | 357/30 |
| 4,239,348 | 12/1980 | Grinberg et al. | 350/342 |
| 4,388,344 | 6/1983 | Shuskus et al. | 350/641 |
| 4,443,064 | 4/1984 | Grinberg et al. | 350/334 |
| 4,509,990 | 4/1985 | Vasudev | 148/1.5 |

OTHER PUBLICATIONS

J. C. Bean et al, "Substrate and Doping Effects upon Laser-Induced Epitaxy of Amorphous Silicon," J. of Applied Physics, vol. 50, No. 2, pp. 881-885, Feb. 1979.

U. Efron et al, "The Silicon Liquid Crystal Light Valve," J. of Applied Physics, vol. 57, No. 4, Feb. 15, 1985, pp. 1356-1368.

U. Efron et al, "The Application of Silicon Liquid Crystal Light Valves to Optical Data Processing," SPIE Proceeding-the International Society for Optical Engineering, vol. 388, Jan. 20-21, 1983, pp. 152-161.

FOREIGN PATENT DOCUMENTS

WO 87/642 1/1987 World Int'l Pat. Off. .

*Primary Examiner*—Stanley D. Miller
*Assistant Examiner*—Richard F. Gallivan
*Attorney, Agent, or Firm*—V. D. Duraiswamy; A. W. Karambelas

[57] ABSTRACT

An LCLV is formed with a sapphire substrate base, a highly doped, thin silicon epitaxial layer forming an ohmic back contact on a smooth surface of the sapphire substrate, and a lightly doped, high resistivity silicon epitaxial layer in the range of about 20-60 microns thick on the back contact. The use of a sapphire substrate provides a better surface quality and higher resolution than previously available with the semiconductor substrates. Lattice defects in the thin back contact are reduced by the formation of a buried amorphous layer adjacent the sapphire substrate, and subsequent recrystallization thereof using the unamorphized portions of the back contact as recrystallization seeds. The application of the invention to both MOS and Schottky diode LCLVs is discussed.

21 Claims, 2 Drawing Sheets

SILICON-ON-SAPPHIRE LIQUID CRYSTAL LIGHT VALVE AND METHOD

BACKGROUND OF THE INVENTION

1. Field of the Invention

This invention relates to liquid crystal light valves (LCLVs), and more particularly to a high resolution LCLV and a method for fabricating the same.

2. Description of the Related Art

LCLVs operate by converting an input image to an output image in which the wavelength, intensity and/or coherence of the original input image are varied. Applications for this type of device include image amplifiers, optical data processing, wavelength converters and incoherent-to-coherent image converters. The basic principles of an alternating current LCLV are described in U.S. Pat. No. 3,824,002 issued to Terry D. Beard, "Alternating Current Liquid Crystal Light Valve". Overviews of silicon-based LCLVs are provided in Efron et al., "The Silicon Liquid-Crystal Light Valve", *Journal of Applied Physics*, Vol. 57, No. 4, Feb. 15, 1985, pages 1356-1368, and Efron et al., "The Applications of Silicon Liquid Crystal Light Valves to Optical Data Processing", *Proceedings of SPIE - The International Society for Optical Engineering*, Vol. 388, Jan. 20-21, 1983, pages 152-161.

A thin, single crystal silicon wafer, generally about 125 microns thick, has previously been used as a substrate in silicon-LCLVs. It is important that the surface of the wafer be flat for good optical quality, and further that a silicon electrode employed in the device by very thin (on the order of a few microns) to achieve high resolution. Unfortunately, the thin semiconductor wafers which it has been necessary to use have only a limited polishing capability, which results in a relatively poor surface quality. Wafer distortion due to high temperature processing, and a limited correction capability while mounting the wafer add to the problems of surface quality. The non-uniformity of the wafer surface is transferred to a liquid crystal layer which is mounted against the wafer, and limits the use of the device for optical processing and adaptive optics applications.

Departing from the field of LCLVs, a technique has been developed in the field of microelectronics in which a silicon film is epitaxially grown on a sapphire base. Called silicon-on-sapphire (SOS), in this technique the insulating sapphire base results in the effective elimination of cross-talk between circuit elements formed from the overlying semiconductor. Although there are differences in the lattice structures of silicon and sapphire, it has been discovered that a silicon film can be epitaxially grown from the sapphire base. In addition to the isolation provided between circuit elements, this approach also allows for high temperature processing. An improvement on the process which provides a higher quality epitaxial growth by significantly reducing the concentration of lattice defects near the sapphire substrate is disclosed in U.S. Pat. No. 4,509,990 to Vasudev, and assigned to Hughes Aircraft Company, the assignee of this invention. In the Vasudev process an amorphous buried layer is formed in the semiconductor near the insulator substrate by implanting an ion species into the semiconductor. The amorphous buried layer is then re-grown "from the top down" using the unamorphized portion further away from the sapphire substrate as a recrystallization seed. This provides a substantially uniform, high quality crystal structure throughout the semiconductor layer.

In addition to microelectronic circuits, the SOS technique is suggested for a liquid crystal photodiode in U.S. Pat. No. 4,198,647 to Grinberg et al., issued Apr. 15, 1980 and assigned to Hughes Aircraft Company. In this patent a junction is formed between a thin layer of p-doped silicon and a much thicker layer of n-doped silicon. The n-doped layer is described as being 5 mils thick, and there is no teaching of how the n-type layer is formed over the thin p-type layer. A suggestion is made for the use of a sapphire substrate, without elaboration as to how it might be implemented, in column 2, lines 54-61 as follows: "Although in one embodiment of this invention a silicon wafer film is used for the semiconductor body, other semiconductor material can also be used for the transfer medium. In addition, the silicon (or other semiconductor) body can be fabricated on an insulating substrate such as sapphire. For example, large area silicon diodes can be built epitaxially on a sapphire layer." Furthermore, the SOS technology at that time was not capable of yielding high resistivity, high uniformity silicon epitaxial layers with the thickness required for Si-LCLV applications.

Despite this activity, no way has yet been found of implementing a LCLV with the desired degree of flatness and high quality thin film silicon.

SUMMARY OF THE INVENTION

In view of the above problems with the related art, this invention seeks to provide an LCLV with a higher degree of flatness and optical quality than has previously been attained. In addition, it is desirable that the new fabrication technique be adaptable to both metal-oxide-semiconductor (MOS) and Schottky diode LCLVs.

These improvements are achieved in the present invention by forming an LCLV with a sapphire substrate which receives input radiation on one side, and has a smooth surface on its other side facing the readout area of the device. A thin silicon layer less than about 1 micron thick, and preferably in the range of about 0.2-0.5 microns, is epitaxially grown on the smooth sapphire surface. The silicon layer is highly doped to render it conductive, so that it functions as an ohmic back contact for the device.

A much thicker silicon layer is then epitaxially grown on the back contact layer, to a thickness of about 20-60 microns. This thicker layer is lightly doped to the same polarity as the back contact layer, so that it exhibits a high resistivity.

The high resistivity layer is followed in turn by a mirror means for reflecting readout light, a liquid crystal layer on the readout side of the mirror means, and a transparent conductive counterelectrode on the other side of the liquid crystal. The LCLV thus formed operates in response to an applied voltage across the back contact and counterelectrode to transduce spatial optical input patterns at the sapphire substrate to a corresponding spatial voltage pattern which modulates the liquid crystal.

The LCLV can be adapted for either MOS or Schottky diode applications. For an MOS device, the mirror means comprises a dielectric mirror and an insulating oxide layer between the dielectric mirror and the silicon high resistivity layer. For a Schottky diode device, the mirror means comprises a metal matrix mirror having a matrix of metallic material which extends through an insulative layer and establishes a Schottky contact with the high resistivity layer. This embodiment may also include a dielectric mirror on the readout side of the metal matrix mirror to block readout light from entering the high resistivity silicon.

The thin epitaxial layer is preferably formed in a manner similar to that described in U.S. Pat. No. 4,509,990 for microelectronic devices. After epitaxially growing the thin silicon layer, it is implanted with an ion species at an implant energy and dosage sufficient to amorphize a buried layer within the silicon. The amorphous buried layer is then regrown to recrystallized form, using the unamorphized portions of the silicon layer as recrystallization seeds.

In addition to an improved surface and crystal quality that enables a practical application of the device to optical data processing and adaptive optics, the potentially simpler processing involved may also benefit the cost and yield of silicon-LCLV devices used for display applications.

Further features and advantages of the invention will be apparent to those skilled in the art from the following detailed description of preferred embodiments, taken together with the accompanying drawings, in which:

DETAILED DESCRIPTION OF PREFERRED EMBODIMENTS

Figure 1:
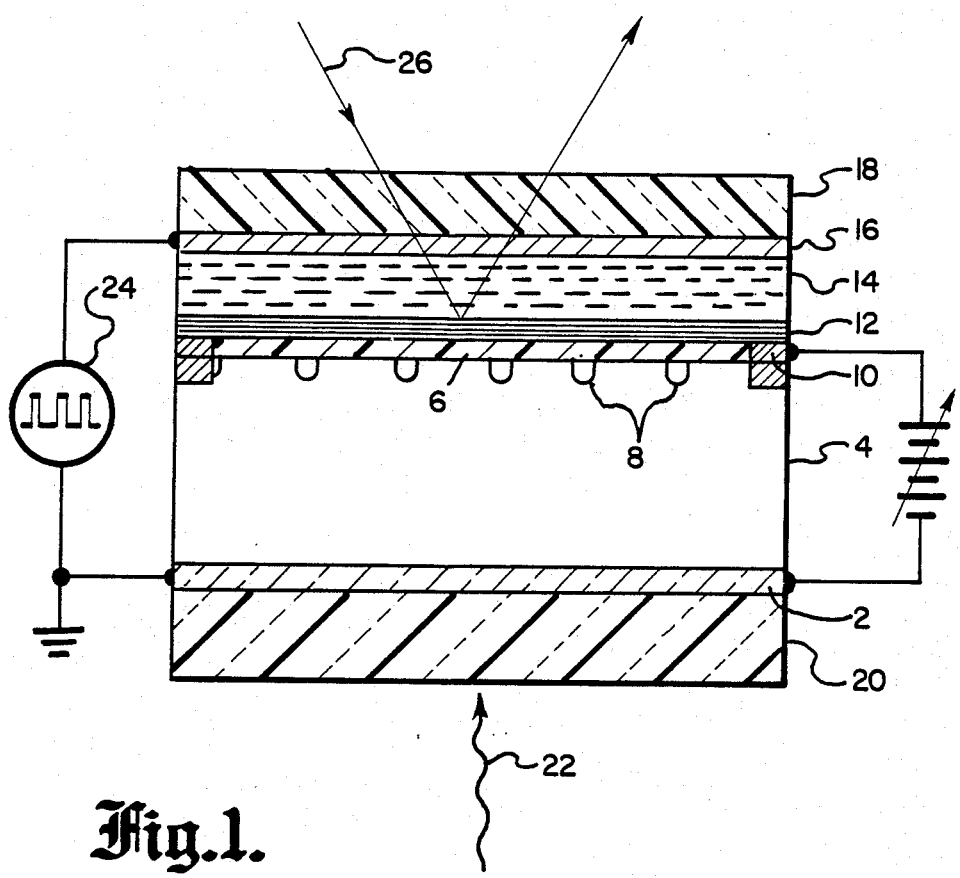
FIG. 1 is a sectional view, not to scale, of an LCLV constructed in accordance with the invention.

A sectional view of an MOS version of a LCLV constructed in accordance with the invention is shown in FIG. 1. This device is generally similar to that illustrated in the articles by Efron et al., "The Applications of Silicon Liquid Crystal Light Valves to Optical Data Processing" and "The Silicon Liquid-Crystal Light Valve", referred to above. It includes a thin p+ silicon back contact 2 which functions as an electrode, and a lightly doped high resistivity p− silicon layer 4 which is formed adjacent the back contact. Back contact 2 is only a few tenths of a micron thick, typically about 0.2–0.5 microns, and is heavily doped with a dopant such as boron to render it essentially conductive. High resistivity layer 4 is on the order of about 20–60 microns thick and has a resistivity in the order of 0.2K ohm-cm. or greater, with a preferred resistivity range of 0.5–2K ohm-cm. A thin $SiO_2$ gate insulator layer 6, typically about 0.2–0.3 microns thick, is formed over the high resistivity layer 4. An n-type microdiode grid 8 is provided consisting of a phosphorous-implanted n− grid at the oxide-photoconductor interface. The grid acts to focus the incoming electrons into the resolution cell which it defines, as well as to form charge buckets of the electrons already residing at the $Si/SiO_2$ interface. This prevents lateral "spill-over" and consequent smearing of the charge pattern.

A guard ring 10 is implanted at the edge of the oxide and adjacent high resistivity layers to prevent peripheral minority carrier injection into the active region. The implantation dose for the microdiode grid 8 is approximately $10^{12}$–$10^{13}$ ions/$cm^2$, while a typical implantation dose for the n-type guard ring 10 is about $10^{13}$ ions/$cm^2$. The formation of the microdiode grid and guard ring can be combined together.

Oxide layer 6 is thermally grown after formation of the microdiode grid and guard ring. This layer constitutes the DC blocking contact to form an MOS configuration, and also activates the implanted dopants in the guard ring and microdiode array.

A dielectric mirror 12, such as an $Si/SiO_2$ quarter wavelength stack, is next disposed over the oxide layer 6. This is followed by a thin layer of fast response liquid crystal, such as positive anisotropy liquid crystal with a 45° twist angle, as the light modulating medium. A transparent indium-tin-oxide (ITO) conductive layer 16 is deposited on a glass or quartz cap 18 which is affixed over the liquid crystal layer as a counterelectrode 16; the entire structure is assembled within an airtight anodized aluminum holder (not shown).

In past devices a silicon substrate has been used for the LCLV, with the accompanying non-uniform thickness, poor surface quality and optical distortion discussed above. The present invention effectively solves this problem by fabricating the device on a sapphire substrate 20. Sapphire is generally transparent to optical radiation in the range of about 0.4–5 microns, which covers the wavelengths of interest. The terms "optical" and "light" are used herein to refer broadly to that portion of the electromagnetic spectrum used with LCLVs, which may include non-visible areas such as infrared as well as the visible spectrum. The sapphire surface upon which back contact 2 is formed is polished so that it is considerably flatter and smoother than the thin silicon wafer surfaces typically employed previously. The back contact 2 provides a high sheet conductivity to present a very small load to any point in the device's cross-section where carriers are generated. Back contact 2 also helps to obtain a linear operation for the device, to avoid having the sensitivity and resolution of the device depend upon the input light level, and provides a higher output uniformity under dark conditions.

In operation, an input image 22 is applied to the sapphire substrate 20 while an AC voltage from source 24 is applied across back contact 2 and counterelectrode 16. The MOS structure refers to the counterelectrode 16 (metal), $SiO_2$ layer 6 (oxide) and photoconductor layer 4 (semiconductor). The device operates in alternating accumulation and depletion phases. In the depletion (active) phase, which last much longer than the accumulation (inactive or refresh) phase, the high resistivity silicon layer 4 is depleted completely. Electron hole pairs generated by the input light 22 are swept by the electric field, producing a signal current which activates the liquid crystal. The electric field existing in the depletion region adjacent the $Si/SiO_2$ interface acts to focus the signal charges and, hence, to preserve the spatial resolution of the input image. The liquid crystal spatially modulates a readout beam 26 which is applied from the readout side of the device through end cap 18, and is reflected off dielectric mirror 12.

In accordance with the invention, back contact 2 is epitaxially grown from the sapphire substrate 20. Procedures for preparing the substrate and for performing the epitaxial deposition are known in the art. For example, see U.S. Pat. No. 3,508,962, U.S. Pat. No. 3,546,036, and J. C. Bean et al., "Substrate and Doping Effects Upon Laser-Induced Epitaxy of Amorphous Silicon", *Journal of Applied Physics*, Vol. 50, No. 2, pages 881–885, February 1979. Desirable crystal orientations are discussed in U.S. Pat. No. 4,509,990 referred to above.

The epitaxial back contact layer 2 is preferably deposited on the surface of the sapphire by a chemical vapor deposition (CVD) step. The CVD growth of the epitaxial layer is preferably performed by the chemical decomposition of silane ($SiH_4$) in an appropriate reactor at approximately 910° C. The epitaxial growth is controlled so as to achieve a silicon epitaxial layer preferably between about 0.1–0.5 micron in thickness within a growth range of approximately 0.3–2.4 microns/min., preferably at a rate of 2.4 microns/min. The minimum film thickness must be sufficient to provide a continuous silicon film having a substantially uniform surface so as to facilitate further processing of the structure.

Figure 2:
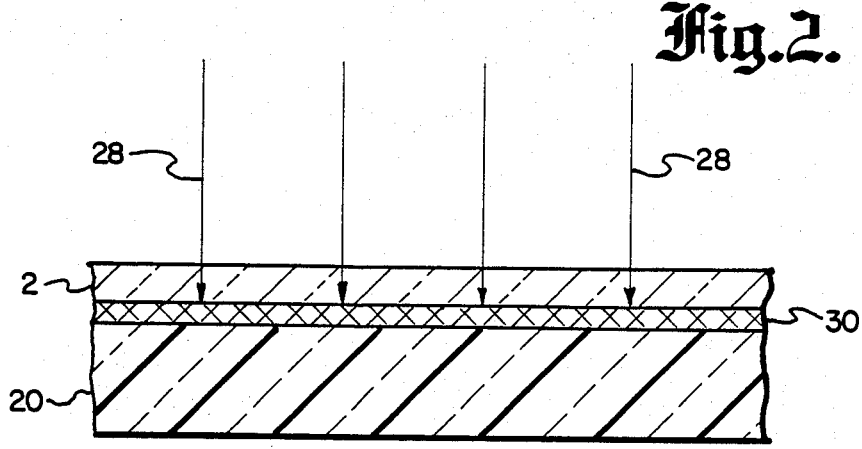
FIG. 2 is a sectional view, not to scale, illustrating the formation of an amorphous buried layer in the thin silicon film as part of the process of obtaining a higher quality silicon.

After the silicon back contact layer 2 has been formed, its crystal quality near the sapphire substrate is improved by means of a solid phase recrystallization technique such as that discussed in U.S. Pat. No. 4,509,990. This technique is illustrated in FIG. 2. An ion species, preferably silicon, is implanted into the back contact silicon layer 2, as illustrated by arrows 28, at an implant energy and dosage sufficient to amorphize a buried layer 30 in the silicon adjacent the sapphire substrate. For a back contact 0.25 micron thick, the corresponding implantation energy and ion dose are approximately 90 KeV and $2 \times 10^{15}$ ions/cm.$^2$, respectively.

The amorphous buried layer 30 is then regrown to recrystallized form, using the high quality unamorphized portions of the silicon layer further removed from the sapphire substrate as recrystallization seeds. Since the crystalline structure in the upper portion of the back contact does not have nearly the defect density as the original crystal structure adjacent the sapphire substrate, regrowing the buried layer using the upper portions of the back contact as seeds results in a regrown buried layer with a greatly reduced defect density. The regrowth can take place over a temperature of about 500°–900° C., but a temperature of about 600° C. is preferred. The recrystallization time increases exponentially for lower temperatures, while substantially higher temperatures can result in a recrystallization rate that is too fast and incurs additional crystal defects. The recrystallization anneal requires from about 30 minutes to about 3 hours.

The back contact may be doped either before or after the formation and recrystallization of the buried amorphous layer. Once the back contact 2 has been completed, the bulk silicon layer 4 is epitaxially grown over it. The presence of the highly doped ohmic back contact assists in the growth of the high resistivity silicon layer 4, since the back contact acts as an effective diffusion barrier for impurities emanating from the sapphire. A 30 micron thick, 1K ohm-cm. high resistivity layer 4 will produce sufficient photovoltage across a 2 micron thick liquid crystal layer to provide the necessary phase modulation of a readout beam.

Figure 3:
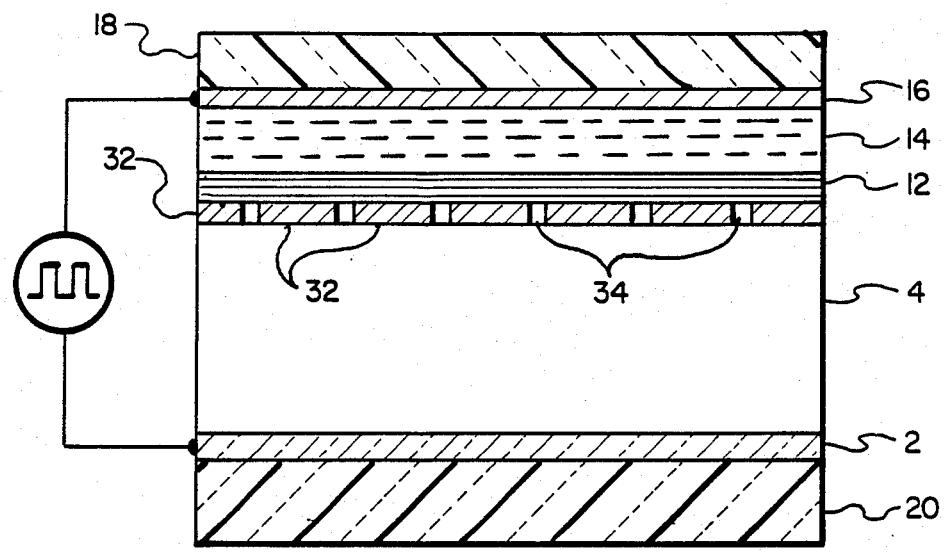
FIG. 3 is a sectional view, not to scale, of a Schottky diode implementation of the invention.
Figure 4:
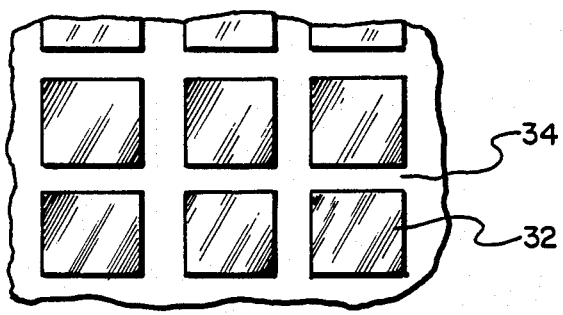
FIG. 4 is a plan view of a portion of the metal matrix mirror used in the Schottky diode embodiment of FIG. 3.

A Schottky diode version of the invention is illustrated in FIG. 3. The sapphire substrate 20, thin back contact epitaxial layer 2, high resistivity silicon layer 4, dielectric mirror 12, liquid crystal layer 14, counterelectrode 16 and cap 18 are essentially similar to the corresponding elements of the MOS device shown in FIG. 1. However, instead of the oxide layer 6, microdiode grid 8 and guard ring 10, an insulating layer such as a chemical vapor deposited oxide is deposited over the bulk silicon layer 4 and etched with a matrix pattern. The insulating layer may be formed from a light blocking or absorbing material such as CdTe. A matrix of metal pads 32 is then deposited within the matrix grid pattern 34 into which the insulating layer is etched, as illustrated in FIG. 4. Each of the metal pads 32 is separated from the adjacent pads by the intervening insulating grid 34. The interface between each metal pad 32 and the underlying silicon layer 4 forms a Schottky diode.

Dielectric mirror 12 is employed in this application for near-visible readout applications in which the high resistivity silicon layer 4 acts as a photoconductor which is photosensitive to the readout light. Although the matrix of metal pads 32 will itself act as a mirror to reflect most of the readout light back through the liquid crystal, a substantial portion of the readout light will be transmitted through the insulating medium between pads and enter the silicon layer 4; the dielectric mirror 12 prevents this from happening. The dielectric mirror can be omitted for applications in which the readout beam wavelength will not interfere with the silicon layer 4. Alternatively, if a light blocking layer such as CdTe is used, the dielectric mirror 12 can be omitted.

A novel, high resolution LCLV and method of fabricating the same have thus been shown and described. While numerous variations and alternate embodiments will occur to those skilled in the art, it is intended that the invention be limited only in terms of the appended claims.

We claim:

1. A high resolution liquid crystal light valve (LCLV) having an input side and a readout side, comprising:
   a sapphire substrate which is substantially transparent to optical radiation at the intended operating wavelength of the LCLV, said substrate having an input side adapted to receive input radiation and a surface facing the readout side, said surface being polished smooth and flat,
   a highly doped conductive silicon epitaxial layer less than about one micron thick forming an ohmic back contact on the smooth sapphire surface,
   a lightly doped, high resistivity silicon epitaxial photoconductor layer on the back contact, said photoconductor layer doped to the same polarity as the thin silicon layer,
   a mirror means on the readout side of the photoconductor layer for reflecting readout light away from the photoconductor layer,
   a liquid crystal layer on the readout side of the mirror means, and
   a transparent conductive counterelectrode on the readout side of the liquid crystal layer,
   the LCLV operating in response to an applied voltage across the back contact and the counterelectrode to transduce spatial optical input patterns at the sapphire substrate to a corresponding spatial voltage pattern modulating the liquid crystal layer.

2. The LCLV of claim 1, said mirror means comprising a dielectric mirror, and an insulative oxide layer between the dielectric mirror and silicon photoconductor layer, thereby rendering the LCLV a metal-oxide-semiconductor (MOS) device.

3. The LCLV of claim 2, wherein the oxide layer is within the range of about 0.2–0.3 microns thick.

4. The LCLV of claim 1, wherein said high resistivity silicon layer is in the range of about 20-60 microns thick.

5. The LCLV of claim 1, said mirror means comprising a metal matrix mirror consisting of an insulative layer adjacent the readout side of the high resistivity layer, and a matrix of metallic material extending through the insulative layer and establishing a Schottky contact with the high resistivity layer.

6. The LCLV of claim 5, said mirror means further comprising a dielectric mirror on the readout side of the metal matrix mirror to block readout light from entering the high resistivity layer.

7. A method of forming a high resolution liquid crystal light valve (LCLV), comprising:
   providing a sapphire substrate which is substantially transparent to optical radiation at the intended operating wavelength of the LCLV,
   polishing a surface of said substrate smooth and flat,
   epitaxially growing a thin layer of silicon less than about one micron thick on the smooth sapphire surface,
   doping the thin silicon layer sufficiently to render it conductive,
   implanting an ion species into the silicon layer at an implant energy and dosage sufficient to amorphize a buried layer portion of the silicon,
   regrowing the amorphous buried layer to recrystallized form using the unamorphized portions of the silicon layer as recrystallization seeds,
   epitaxially growing a second layer of silicon on the conductive silicon layer,
   lightly doping the second silicon layer with the same polarity dopant as the thin silicon layer to a high resistivity of at least about 0.2K ohm-cm,
   forming a mirror means on the high resistivity layer,
   forming a liquid crystal layer on the opposite side of the mirror means from the high resistivity layer, and
   forming a transparent conductive counterelectrode on the opposite side of the liquid crystal layer from the mirror means.

8. The method of claim 7, said mirror means comprising a dielectric mirror.

9. The method of claim 8, further comprising the formation of an insulative oxide layer between the dielectric mirror and high resistivity layer, thereby rendering the LCLV a metal-oxide-semiconductor (MOS) device.

10. The method of claim 7, wherein the mirror means comprises a metal matrix mirror set in an insulative layer and contacting the high resistivity layer to form a Schottky contact therewith.

11. The method of claim 10, wherein the mirror means further comprises a dielectric mirror on the opposite side of the metal matrix mirror from the high resistivity layer to block readout light transmitted through the liquid crystal from entering the photoconductor layer.

12. The method of claim 7, wherein the high resistivity second silicon layer is grown to a thickness of about 20-60 microns.

13. The method of claim 7, wherein said second silicon layer is doped to a resistivity within the range of about 0.5-2K ohm-cm.

14. A method of forming a base for a liquid crystal light valve (LCLV), comprising:
   providing a sapphire substrate which is substantially transparent to optical radiation at the intended operating wavelength of the LCLV,
   polishing a surface of said substrate smooth and flat,
   epitaxially growing a first thin layer of silicon less than about one micron thick on the smooth sapphire surface,
   doping the thin silicon layer sufficiently to render it conductive,
   implanting an ion species into the silicon layer at an implant energy and dosage sufficient to amorphize a buried layer portion of the silicon,
   regrowing the amorphous buried layer to recrystallized form using the unamorphized portions of the silicon layer as recrystallization seeds,
   epitaxially growing on the first silicon layer a second layer of silicon thicker than the first layer, and
   doping the second silicon layer with the same polarity dopant as the first layer to a high resistivity of at least about 0.2K ohm-cm.

15. The method of claim 14, wherein the first silicon layer is grown to about 0.1-0.5 microns thick.

16. The method of claim 14, wherein the second silicon layer is grown to about 20-60 microns thick.

17. The method of claim 14, wherein the ion species is implanted before the first silicon layer is doped.

18. The method of claim 14, wherein the first silicon layer is doped before the ion species is implanted.

19. The method of claim 14, wherein said second silicon layer is doped to a resistivity within the range of about 0.5-2K ohm-cm.

20. A base for a liquid crystal light valve (LCLV), comprising:
   a sapphire substrate which is substantially transparent to optical radiation at the intended operating wavelength of the LCLV, said substrate having a surface which is polished smooth and flat,
   a first, highly doped conductive silicon epitaxial layer less than about one micron thick on the smooth sapphire surface, and
   a lightly doped, high resistivity epitaxial silicon layer in the range of about 20-60 microns thick on the first layer and doped to the same polarity as the first silicon layer.

21. The LCLV of claim 20 wherein the first silicon layer is grown to about 0.1-0.5 microns thick.

* * * * *